(12) United States Patent
Chaiken

(10) Patent No.: US 10,204,038 B2
(45) Date of Patent: Feb. 12, 2019

(54) SYSTEM AND METHOD OF EMBEDDING MESSAGES INTO TRACE DATA

(71) Applicant: Dell Products L.P., Round Rock, TX (US)

(72) Inventor: Craig Lawrence Chaiken, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 64 days.

(21) Appl. No.: 15/611,193

(22) Filed: Jun. 1, 2017

(65) Prior Publication Data

US 2018/0349263 A1    Dec. 6, 2018

(51) Int. Cl.
*G06F 12/02* (2006.01)

(52) U.S. Cl.
CPC .. *G06F 12/0223* (2013.01); *G06F 2212/1008* (2013.01)

(58) Field of Classification Search
CPC ............... G06F 12/0223; G06F 2212/1008
See application file for complete search history.

(56) References Cited

U.S. PATENT DOCUMENTS 5,778,231 A * 7/1998 Van Hoff .................. G06F 8/54
717/143
6,829,760 B1 * 12/2004 Bera ................... G06F 9/44521
717/142
2016/0335294 A1 * 11/2016 Gruenwald ....... G06F 17/30312

OTHER PUBLICATIONS

Intel Corporation, "Intel® Trace Hub (Intel® TH)" Developer's Manual, Revision 1.0.2, Feb. 2016; 383 pages.
Intel Corporation, "Intel® Trace Hub (Intel® TH)" Developer's Manual, Revision 2.1.1, Dec. 2016; 549 pages.

* cited by examiner

*Primary Examiner* — Ryan Bertram
(74) *Attorney, Agent, or Firm* — Baker Botts L.L.P.

(57) ABSTRACT

In one or more embodiments, one or more methods, processes and/or systems may receive multiple characters (e.g., a string), determine multiple offsets respectively corresponding to the multiple characters, determine multiple addresses based on a base address and the multiple offsets respectively corresponding to the multiple characters, and execute multiple subroutine call instructions to each of the multiple addresses. In one or more embodiments, an execution log of the subroutine call instructions to each of the multiple addresses may be analyzed. For instance, the execution log of the subroutine call instructions to each of the multiple addresses may be utilized in determining the multiple characters (e.g., the string) that were received. In one or more embodiments, determining the multiple characters may include determining offsets from a base address and utilizing the offsets as a mapping to characters. For example, the string may be recovered and/or recreated from the offsets.

20 Claims, 10 Drawing Sheets

SYSTEM AND METHOD OF EMBEDDING MESSAGES INTO TRACE DATA

BACKGROUND

Field of the Disclosure

This disclosure relates generally to information handling systems and more particularly to embedding messages into trace data.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. In the past, processor execution traces were logged to memory or to another computer system and did not provide a context for a code flow change, creating inefficiency in debugging tasks. In one example, if a branch log shows that a branch occurred because a value was above zero, there is no way to determine if the value was one or one hundred. In another example, embedding context data into execution traces was not possible.

SUMMARY

In one or more embodiments, a processor of an information handling system may provide execution logging. For example, the execution logging may provide information associated with instruction execution to one or more of a memory medium and a network. In one or more embodiments, one or more strings may be encoded into a series of processor instructions, where the processor instructions may point to addresses in an array in a memory medium, and each element of the array may include a processor instruction (e.g., a no operation instruction, a return instruction, etc.). For example, multiple characters (e.g., a string of characters) may be received, and multiple offsets respectively corresponding to the multiple characters may be determined. For instance, multiple addresses, based on a base address, and the multiple offsets respectively corresponding to the multiple characters may be determined, and subroutine call instructions to each of the multiple addresses may be executed.

In one or more embodiments, the execution logging may log the subroutine call instructions to each of the multiple addresses. For example, the log of the subroutine call instructions to each of the multiple addresses may be analyzed. For instance, the log of the subroutine call instructions to each of the multiple addresses may be utilized in determining the multiple characters (e.g., the string of characters) that were received. In one or more embodiments, determining the multiple characters may include determining offsets from a base address and utilizing the offsets as a mapping to characters. For example, the string may be recovered and/or recreated from the offsets from the base address.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
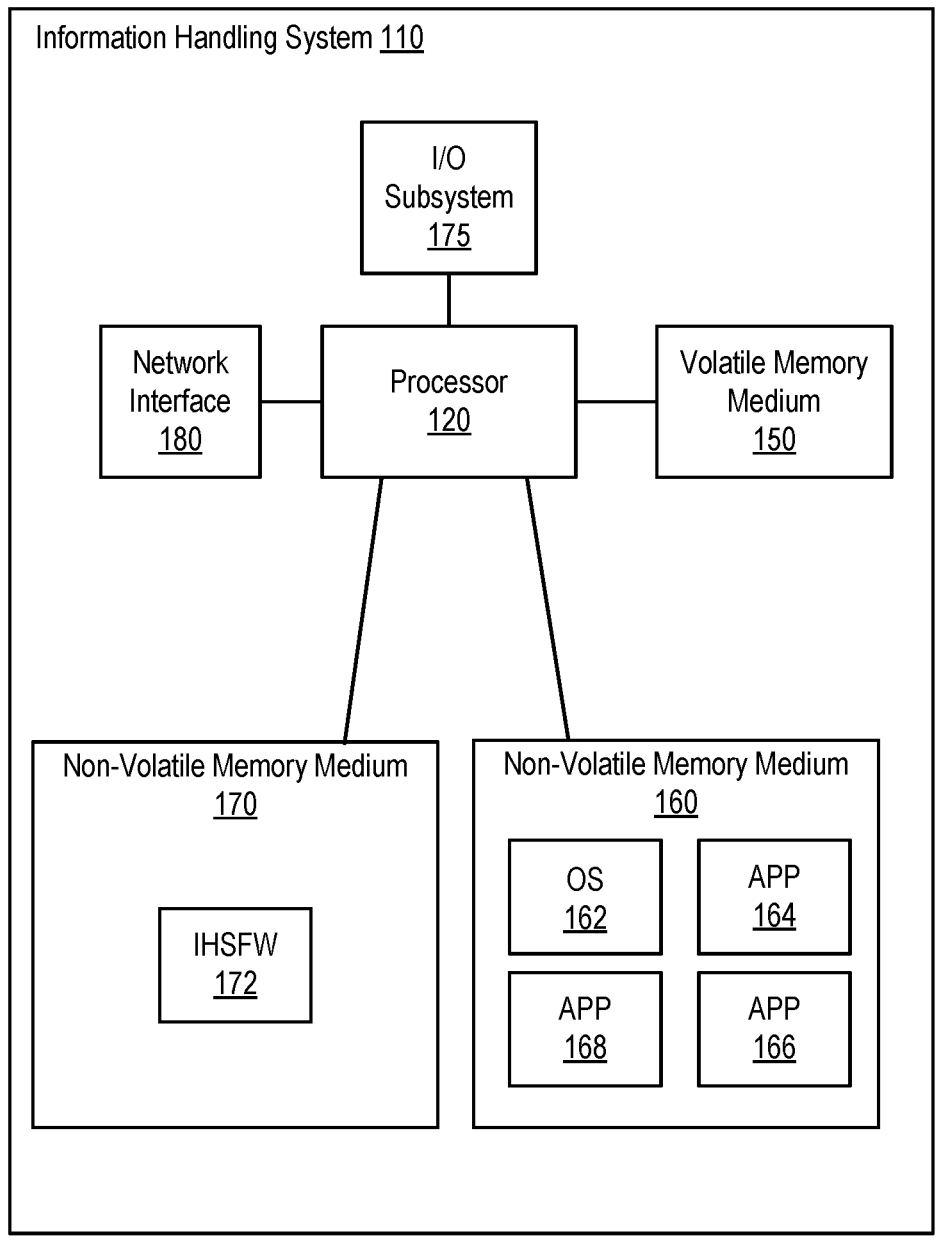
FIG. 1 illustrates an exemplary information handling system, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral followed by a letter refers to a specific instance of an element and the numeral only form of the reference numeral refers to the collective element. Thus, for example, device '12A' refers to an instance of a device class, which may be referred to collectively as devices '12' and any one of which may be referred to generically as a device '12'.

In one or more embodiments, a processor of an information handling system may provide execution logging. For example, the execution logging may provide information associated with instruction execution to one or more of a memory medium and a network. For instance, the instruction execution may include execution of one or more of a branch instruction, a call instruction, and a jump instruction, among others. In one or more embodiments, context information associated with the execution logging may be provided to the one or more of the memory medium and the network. For example, the context information may include one or more strings (e.g., one or more ASCII strings, one or more Unicode strings, etc.). For instance, one or more strings may be encoded into a series of processor instructions, where the processor instructions point to addresses in an array in a memory medium, and each element of the array may include a processor instruction (e.g., a no operation instruction, a return instruction, etc.).

In one or more embodiments, based on the addresses in the array, an application may decode characters of the one or more strings. For example, each address in the array may correspond to a character that may be utilized in a string. In one or more embodiments, message security may be utilized. For example, an embedded message may utilize one of multiple alternative array arrangements. For instance, the application may utilize an alternative array arrangement (e.g., a mapping) to properly decode the one or more encoded strings.

Turning now to FIG. 1, an exemplary information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a personal digital assistant (PDA), a consumer electronic device, an electronic music player, an electronic camera, an electronic video player, a network storage device, or another suitable device and may vary in size, shape, performance, functionality, and price. In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, term "memory medium" may mean a "storage device", a "memory", a "memory device", "tangible computer readable storage medium", and/or "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others In one or more embodiments, processor 120 may execute processor instructions in implementing one or more systems, flowcharts, methods, and/or processes described and/or illustrated herein. In one example, processor 120 may execute processor instructions from one or more of memory media 150-170 in implementing one or more systems, flowcharts, methods, and/or processes described and/or illustrated herein. In another example, processor 120 may execute processor instructions via network interface 180 in implementing one or more systems, flowcharts, methods, and/or processes described and/or illustrated herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Turning now to FIGS. 2A-3D, an exemplary memory medium is illustrated, according to one or more embodiments. As shown in FIGS. 2A-2D, volatile memory medium 150 may include instructions 2000-2255 executable by processor 120. In one or more embodiments, instructions 2000-2255 may include a return instruction executable by processor 120. For example, addresses of instructions 2000-2255 may be or include possible addresses that may be utilized in calling subroutines. As illustrated in FIGS. 3A-3D, volatile memory medium 150 may include instructions 3000-3255 and 360 executable by processor 120. In one or more embodiments, instructions 3000-3255 may include a no operation instruction executable by processor 120, and instruction 360 may include a return instruction executable by processor 120. In one example, addresses of instructions 3000-3255 may be or include possible addresses that may be utilized in calling subroutines. In another example, when processor executes an instruction of instructions 3000-3255, processor 120 may continue to process a next instruction. In one instance, the next instruction may be the no operation instruction. In another instance, the next instruction may be the return instruction.

In one or more embodiments, each element of an array may store an instruction. In one example, the array may be allocated in volatile memory medium 150. In a second example, the array may include instructions 2000-2255. For instance, a return instruction is stored in each of instructions 2000-2255. In another example, the array may include instructions 3000-3255. For instance, a no operation instruction is stored in each of instructions 3000-3255. In one or more embodiments, a lookup table may include the array. In one example, illustrated in FIG. 2B, a lookup table 270 may include instructions 2000-2255. For instance, an address of lookup table 270 may be an address of instruction 2000. In another example, shown in FIG. 3B, a lookup table 370 may include instructions 3000-3255. For instance, an address of lookup table 370 may be an address of instruction 3000.

In one or more embodiments, when a no operation instruction is executed, a next instruction may be executed. In one example, when instruction 3001 is executed, instruction 3002 may be executed next. In another example, when instruction 3255 is executed, instruction 360 may be executed next. In this fashion, for instance, executing an instruction of instructions 3000-3255 may "fall-through" to instruction 360. In one or more embodiments, utilizing no operations instructions may be beneficial. In one example, a no operation instruction may include an instruction size smaller than an instruction size of a return instruction in one or more instruction set architectures (ISAs). In another example, multiple instructions may be utilized in a return from a subroutine in one or more ISAs. For instance, instruction 360 may represent one or more instructions that may be utilized in returning from a subroutine.

Figure 2A:
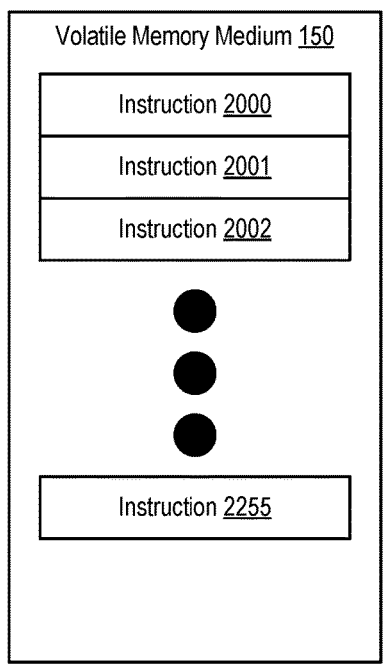
FIGS. 2A-3D illustrate an exemplary memory medium that store processor instructions, according to one or more embodiments.
Figure 2B:
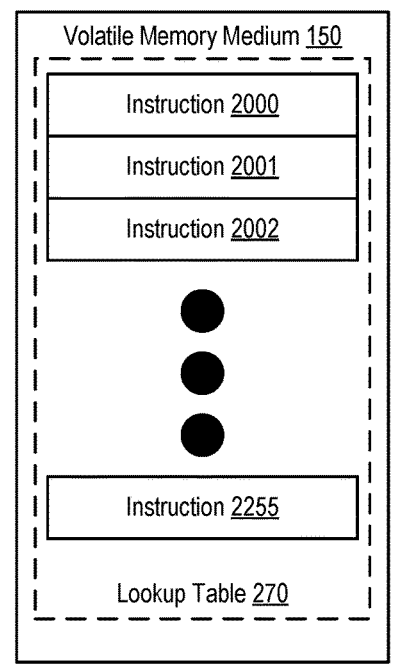
Figure 2C:
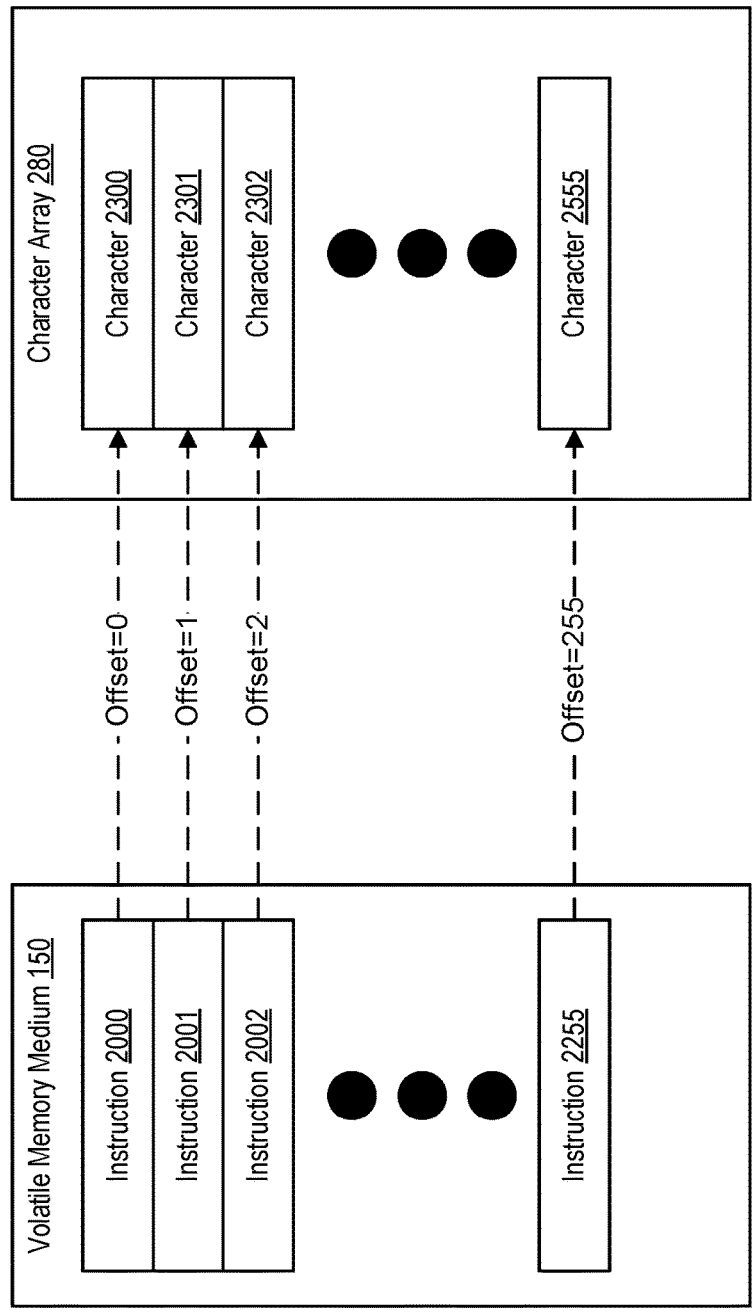

As illustrated in FIG. 2C, a character array 280 may include characters 2300-2555. In one or more embodiments, instructions 2000-2255 may map to characters 2300-2555. For example, an instruction of instructions 2000-2255 may map to a character of characters 2300-2555 via an offset. In one instance, instruction 2000 may map to character 2300 via an offset of zero (0). In a second instance, instruction 2002 may map to character 2302 via an offset of two (2). In another instance, instruction 2255 may map to character 2555 via an offset of two hundred and fifty-five (255). In one or more embodiments, an offset may include one or more bytes. In one example, each of characters 2300-2555 may be a single byte. For instance, an offset of two (2) may be two (2) bytes into character array 280. In another example, each of characters 2300-2555 may be two (2) bytes. In one instance, an offset of two (2) may be four (4) bytes into character array 280. In another instance, an offset of two hundred and fifty-five (255) may be five hundred and ten (510) bytes into character array 280.

Figure 2D:
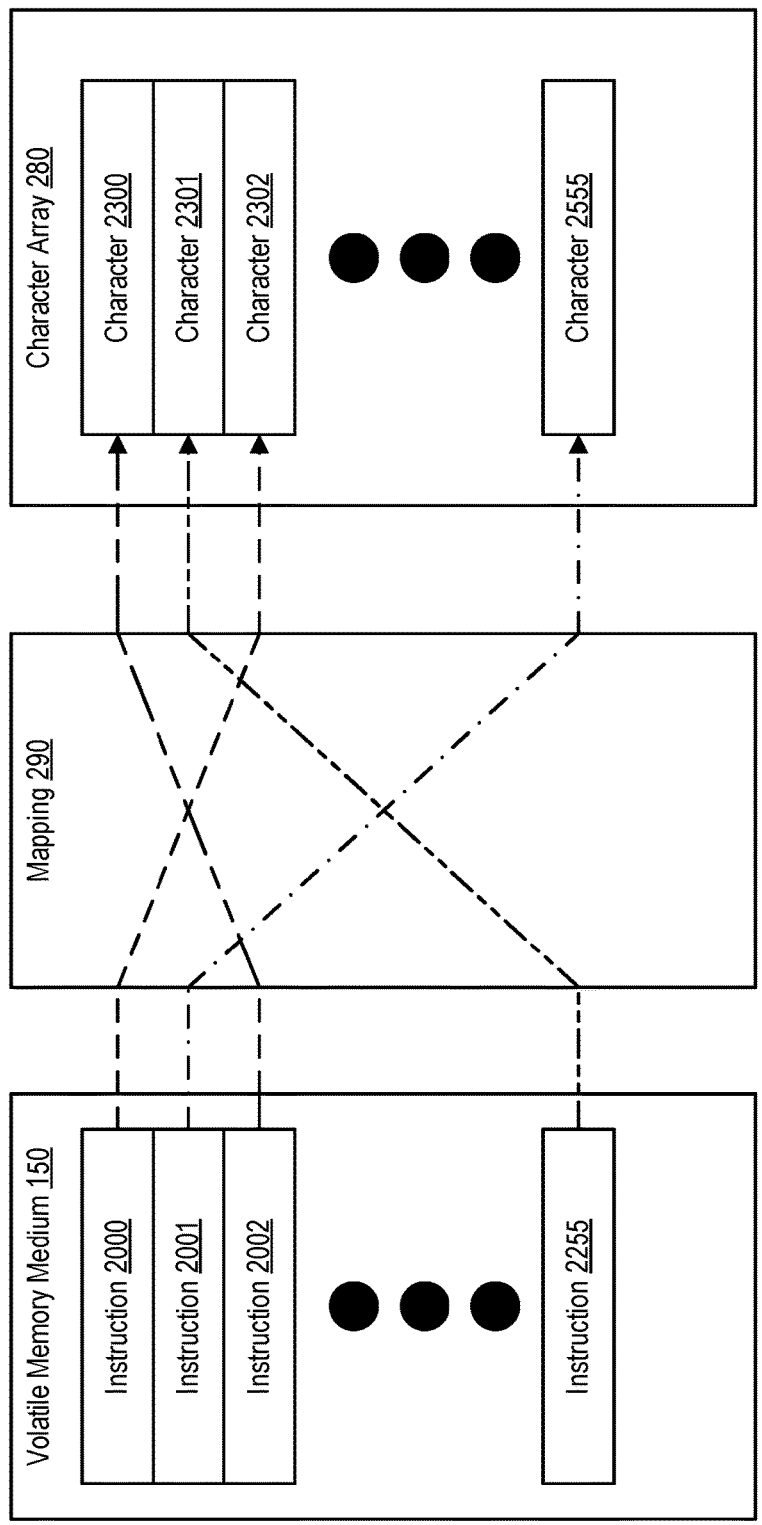

As shown in FIG. 2D, instructions 2000-2255 may map to characters 2300-2555 via a mapping 290. In one or more embodiments, offsets of instructions 2000-2255 from a base address may be applied to mapping 290. As illustrated, instruction 2000 may map to character 2302, instruction 2001 may map to character 2555, instruction 2002 may map to character 2300, and instruction 2255 may map to character 2301. In one or more embodiments, mapping 290 may be utilized in providing a measure of security.

Figure 3A:
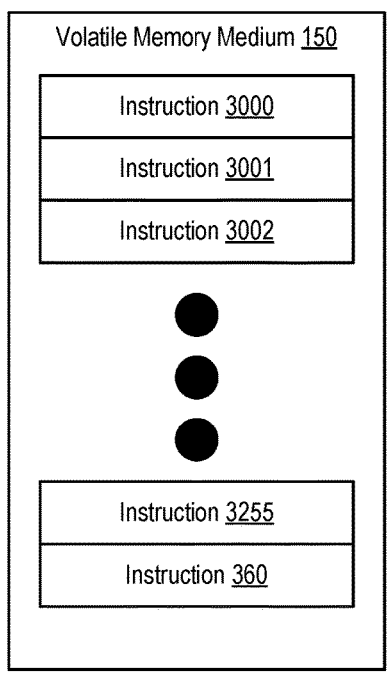
Figure 3B:
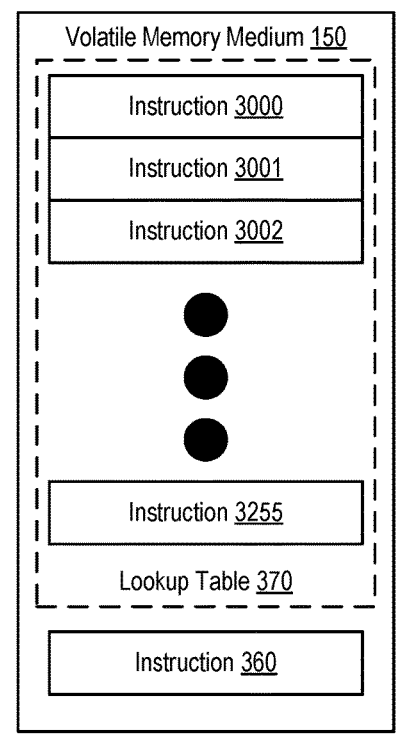
Figure 3C:
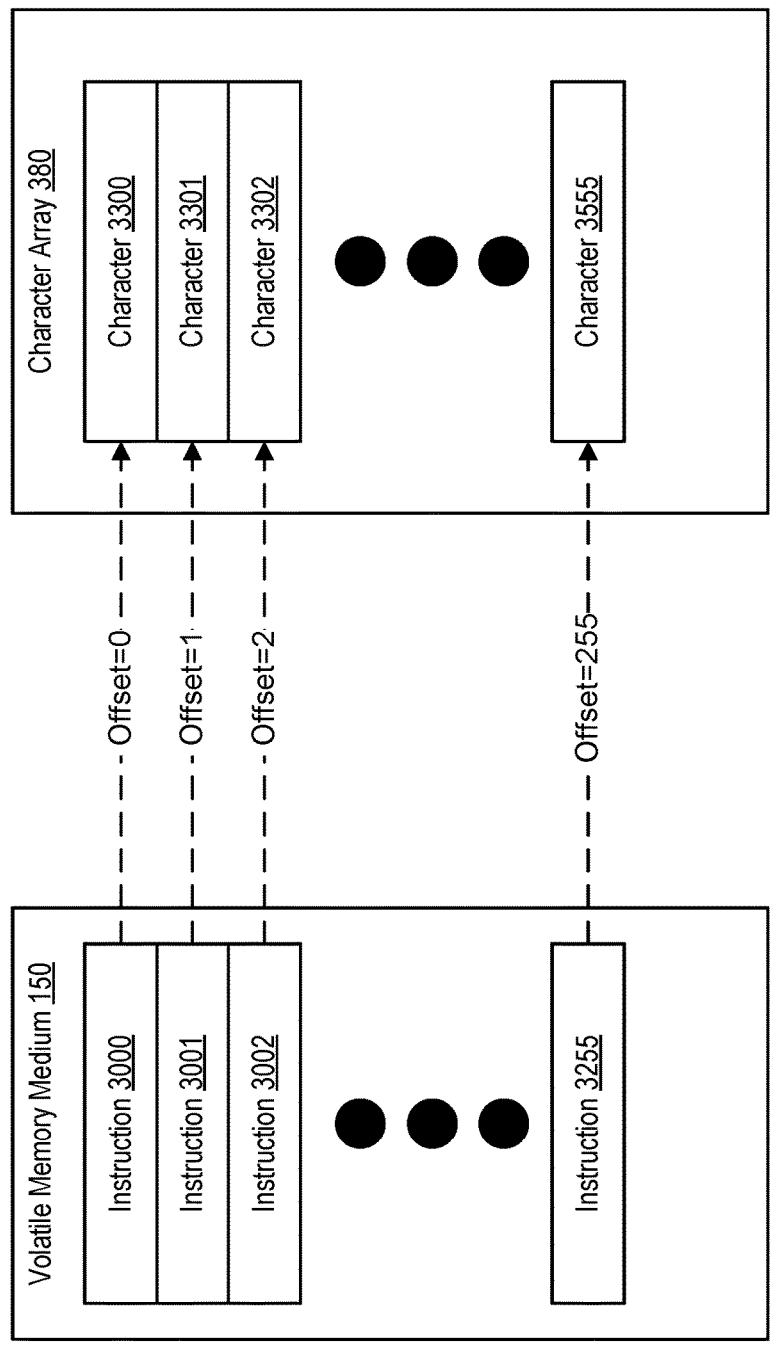

As illustrated in FIG. 3C, a character array 380 may include characters 3300-3555. In one or more embodiments, instructions 3000-2255 may map to characters 3300-3555. For example, an instruction of instructions 3000-3255 may map to a character of characters 3300-3555 via an offset. In one instance, instruction 3000 may map to character 3300 via an offset of zero (0). In a second instance, instruction 3002 may map to character 3302 via an offset of two (2). In another instance, instruction 3255 may map to character 3555 via an offset of two hundred and fifty-five (255). In one or more embodiments, an offset may include one or more bytes. In one example, each of characters 3300-3555 may be a single byte. For instance, an offset of two (2) may be two (2) bytes into character array 380. In another example, each of characters 3300-3555 may be two (2) bytes. In one instance, an offset of two (2) may be four (4) bytes into character array 380. In another instance, an offset of two hundred and fifty-five (255) may be five hundred and ten (510) bytes into character array 380.

Figure 3D:
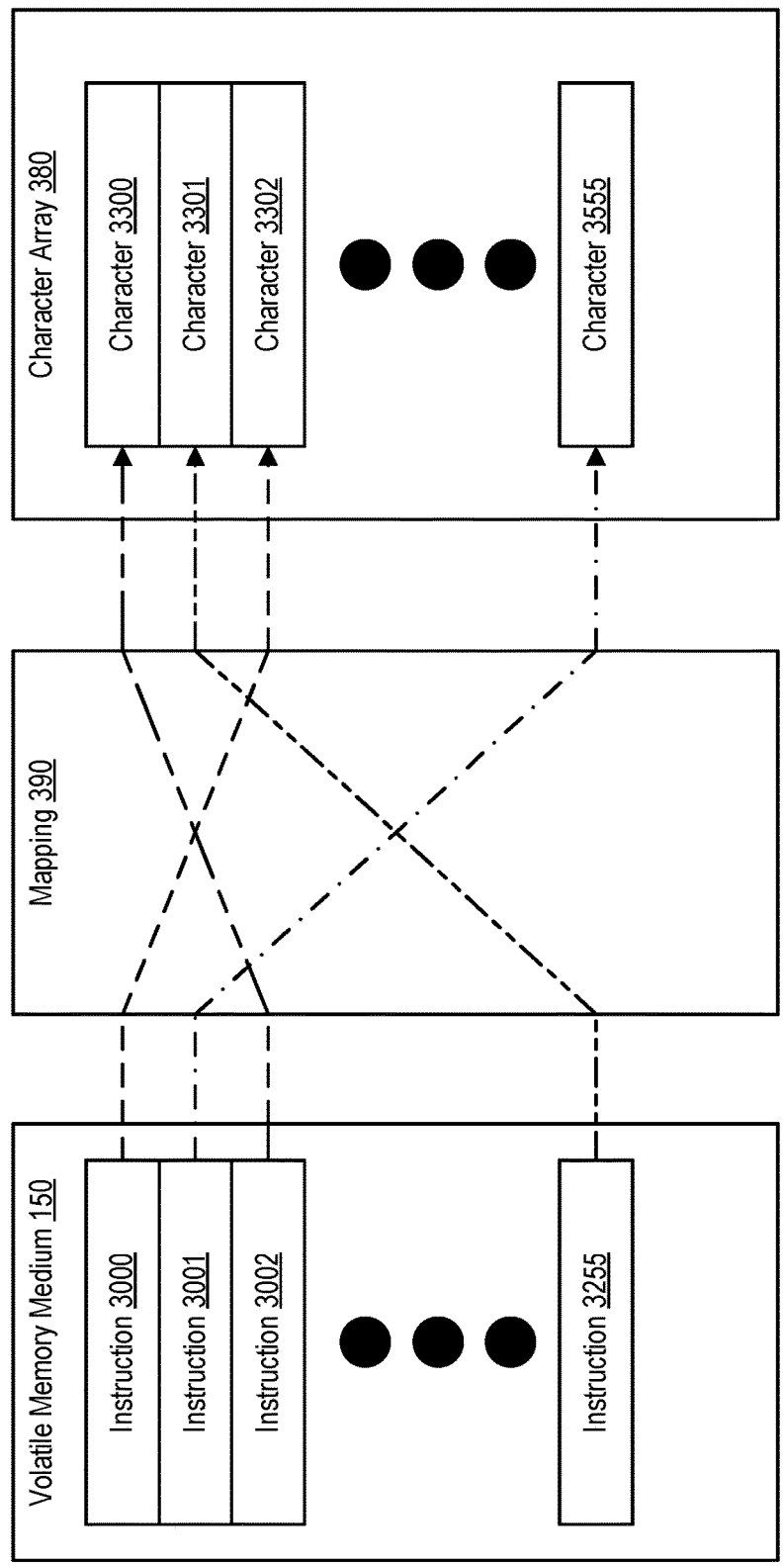

As shown in FIG. 3D, instructions 3000-3255 may map to characters 3300-3555 via a mapping 390. In one or more embodiments, offsets of instructions 3000-2255 from a base address may be applied to mapping 390. As illustrated, instruction 3000 may map to character 3302, instruction 3001 may map to character 3555, instruction 3002 may map to character 3300, and instruction 3255 may map to character 3301. In one or more embodiments, mapping 390 may be utilized in providing a measure of security.

Figure 4:
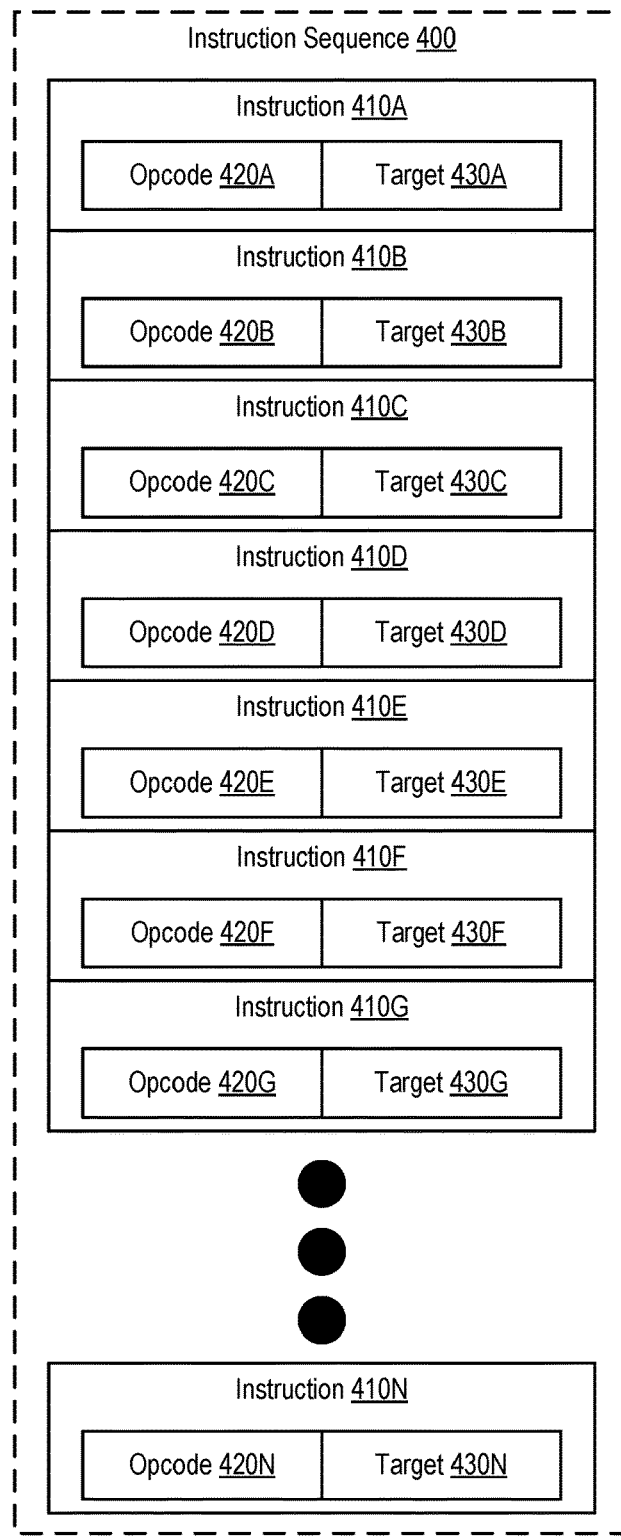
FIG. 4 illustrates an exemplary instruction sequence, according to one or more embodiments.

Turning now to FIG. 4, an exemplary instruction sequence is illustrated, according to one or more embodiments. As shown, an instruction sequence 400 may include instructions 410A-410N. In one or more embodiments, instructions 410A-410N may include subroutine call instructions. For example, a subroutine call instruction may include a call instruction, a jump instruction, a jump and link instruction, a branch instruction, a branch and link instruction, etc. As illustrated, an instruction 410 may include an opcode 420 and a target 430. In one or more embodiments, each of opcodes 420A-420N may include a call opcode, a jump opcode, a jump and link opcode, a branch opcode, a branch and link opcode, etc., and each of targets 430A-430N may include an address, a register identifier of a register that stores the address, or an offset from a program counter that may be utilized to determine the address. In one example, the address may include an address of an instruction of instructions 2000-2255. In another example, the address may include an address of an instruction of instructions 3000-3255.

Figure 5:
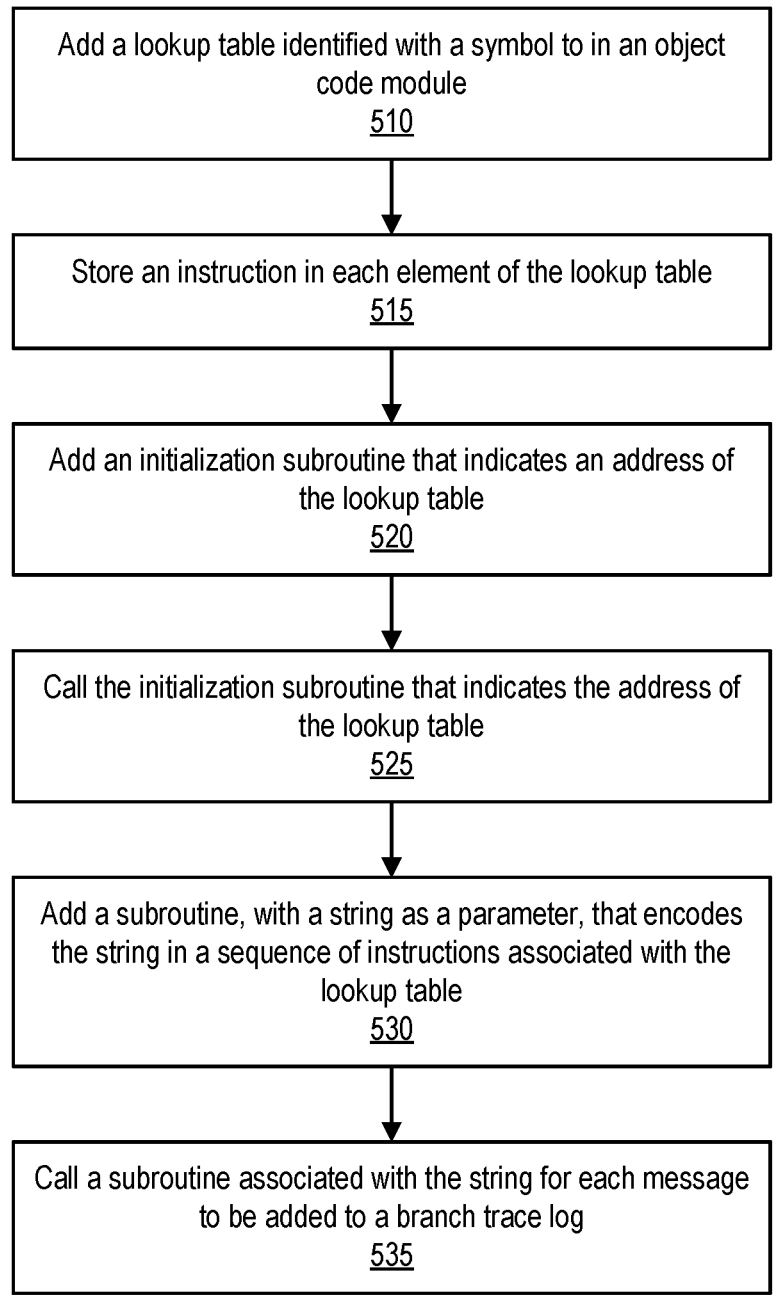
FIG. 5 illustrates an exemplary method of utilizing an instruction sequence to encode one or more strings, according to one or more embodiments.

Turning now to FIG. 5, an exemplary method of utilizing an instruction sequence to encode one or more strings is illustrated, according to one or more embodiments. At 510, a lookup table may be added to an object module and may be identified with a symbol to in the object module. In one example, the lookup table may include lookup table 270. In a second example, the lookup table may include lookup table 370. In one or more embodiments, the symbol may include "lookup". At 515, an instruction may be stored in each element of the lookup table. In one example, instructions 2000-2255 may be stored in the lookup table. In another example, instructions 3000-3255 may be stored in the lookup table.

At 520, an initialization subroutine that indicates an address of the lookup table may be added. For example, the initialization subroutine that indicates the address of the lookup table may be added to source code or to object code (e.g., the object module). In one or more embodiments, the initialization subroutine may call an address of the lookup table with an increasing offset a number of times. For example, the initialization subroutine may call a first four instructions of the lookup table. In one instance, the initialization subroutine may sequentially call instructions 200-203. In another instance, the initialization subroutine may sequentially call instructions 300-303. In one or more embodiments, calling a subroutine multiple times with sequential instruction size offsets may provide a signature to an execution log. For example, an analyzer (e.g., an application) of the execution log may identify that four subroutines were called with addresses with offsets an instruction size apart. For instance, the analyzer may determine a base address of these subroutine calls and utilize the base address as an address of the lookup table.

At 525, the initialization subroutine that indicates the address of the lookup table may be called. In one example, the initialization subroutine that indicates the address of the lookup table may determine addresses from the base address and sequentially increment the base address by a size of a subroutine call instruction for a number of times. For instance, with a number of time being four, the initialization subroutine that indicates the address of the lookup table may determine a first address of the base address plus the size of the subroutine call instruction, a second address of the base address plus two times the size of the subroutine call instruction, a third address of the base address plus three times the size of the subroutine call instruction, and a fourth address of the base address plus three times the size of the subroutine call instruction, and execute subroutine call instructions to the first address, the second address, the third address, and the fourth address. In another example, the initialization subroutine that indicates the address of the lookup table may determine and execute a subroutine call instruction of the base address, may determine and execute a subroutine call instruction of the base address plus the size of the subroutine call instruction, may determine and execute a subroutine call instruction of the base address plus two times the size of the subroutine call instruction, may determine and execute a subroutine call instruction of the base address plus three times the size of the subroutine call instruction, etc.

At 530, a subroutine, with a string as a parameter, that encodes the string in a sequence of instructions associated with the lookup table may be added. For example, the subroutine, with the string as the parameter, that encodes the string in the sequence of instructions associated with the lookup table may be added to source code or to object code (e.g., the object module).

In one or more embodiments, the subroutine, with the string as the parameter, that encodes the string in the sequence of instructions associated with the lookup table may produce a sequence of instructions that may be utilized to reproduce the string. In one example, the string may include American Standard Code for Information Interchange (ASCII) characters, and each ASCII character may be represented by an offset from a base address of the lookup table. For instance, a string of "Run14" may be represented by a sequence of instructions (e.g., a sequence of subroutine calls to): the base address of the lookup table plus eighty-two (82), the base address of the lookup table plus one hundred and seventeen (117), the base address of the lookup table plus one hundred and ten (110), the base address of the lookup table plus forty-nine (49), the base address of the lookup table plus fifty-two (52), and the base address of the lookup table zero (0), as the string may be NULL-terminated.

In another example, the string may include characters that may map to multiple numbers. In one instance, 'A' through 'Z' may map to 1-26, and '0'-'9' may map to 27-36. In another instance, the string may include Unicode characters that map to numbers. In one or more embodiments, instruction sequence 400 may include the sequence of instructions produced by the subroutine, with the string as the parameter, that encodes the string in the sequence of instructions associated with the lookup table. At 535, the subroutine, with the string as the parameter, that encodes the string in the sequence of instructions associated with the lookup table may be called for each message to be added to a branch trace log.

Figure 6:
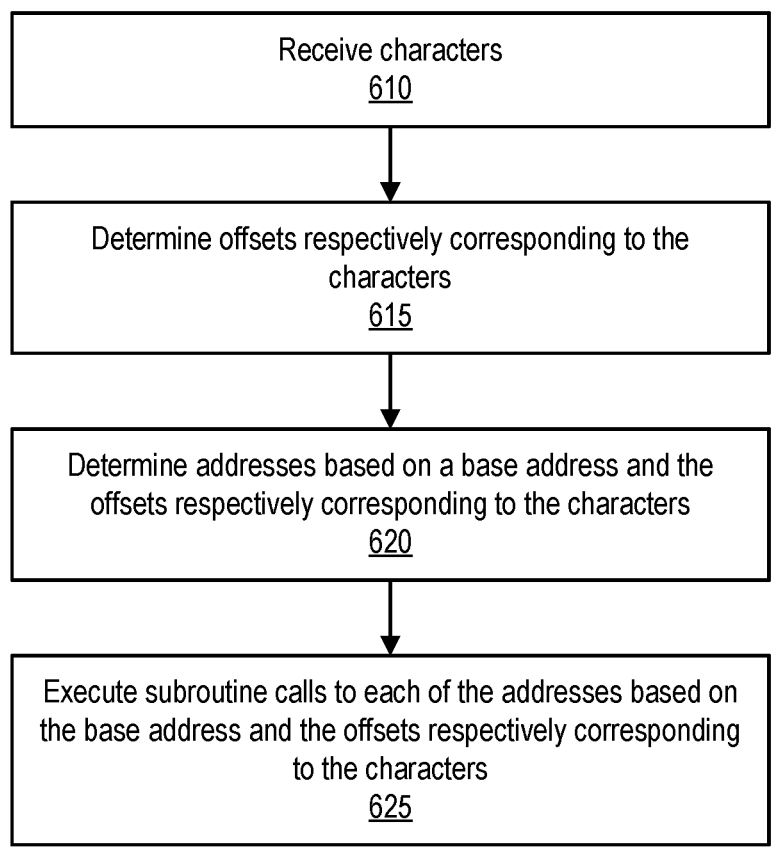
FIG. 6 illustrates a method of encoding a string of characters into a sequence of instructions, according to one or more embodiments.

Turning now to FIG. 6, a method of encoding a string of character into a sequence of instructions is illustrated, according to one or more embodiments. At 610, characters may be received. For example, a string of characters may be received. In one instance, the characters may include ASCII characters that map to numbers. In a second instance, the characters may include characters that may map to multiple numbers. In another instance, the characters may include Unicode characters that map to numbers.

At 615, offsets respectively corresponding to the characters may be determined. In one or more embodiments, the numbers of the mapping may be utilized in determining the offsets. For example, the numbers may be the offsets. For instance, offsets from ASCII characters of 'u', 'n', '1', '4', and '\0' (e.g., a NULL character) may be eighty-two (82), one hundred and seventeen (117), one hundred and ten (110), and forty-nine (49), fifty-two (52), and zero (0). At 620, addresses based on a base address and the offsets respectively corresponding to the characters may be determined. For example, the addresses based on the base address and the offsets respectively corresponding to the characters may include the base address plus eighty-two (82), the base address plus one hundred and seventeen (117), the base address plus one hundred and ten (110), the base address plus forty-nine (49), the base address plus fifty-two (52), and the base address zero (0).

At 625, subroutine calls to each of the addresses based on the base address and the offsets respectively corresponding to the characters may be executed. For example, processor 120 may execute a sequence of instructions that includes subroutine calls to the addresses based on the base address and the offsets respectively corresponding to the characters. For instance, the sequence of instructions that includes subroutine calls to the addresses based on the base address and the offsets respectively corresponding to the characters may include the base address plus eighty-two (82), the base address plus one hundred and seventeen (117), the base address plus one hundred and ten (110), the base address plus forty-nine (49), the base address plus fifty-two (52), and the base address zero (0).

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
  a processor;
  a memory medium coupled to the processor and that stores instructions executable by the processor;
  wherein as the processor executes the instructions, the information handling system:
    receives a plurality of characters;
    determines a plurality of offsets respectively corresponding to the plurality of characters;
    determines a first plurality of addresses based on a base address and the plurality of offsets respectively corresponding to the plurality of characters; and
    executes a first plurality of subroutine call instructions to each of the first plurality of addresses.

2. The information handling system of claim 1, wherein the information handling system further:
  determines a second plurality of addresses from the base address and sequentially incrementing by a size of a subroutine call instruction for a number of times; and executes a second plurality of subroutine call instructions to each of the second plurality of addresses.

3. The information handling system of claim 2, wherein the information handling system executes the second plurality of subroutine call instructions to each of the second plurality of subroutine addresses before the information handling system executes the first plurality of subroutine call instructions to each of the first plurality of addresses.

4. The information handling system of claim 1, wherein the plurality of characters includes a plurality of American Standard Code for Information Interchange (ASCII) characters.

5. The information handling system of claim 1, wherein the information handling system further allocates an array in a memory medium, wherein elements of the array are associated with possible addresses of the first plurality of addresses.

6. The information handling system of claim 1, wherein a return instruction or a no operation instruction is stored at each of the first plurality of addresses.

7. The information handling system of claim 6,
wherein the no operation instruction is stored at each of the first plurality of addresses; and
wherein the return instruction is stored at an address subsequent to a plurality of possible addresses of the first plurality of addresses.

8. A method, comprising:
receiving a plurality of characters;
determining a plurality of offsets respectively corresponding to the plurality of characters;
determining a first plurality of addresses based on a base address and the plurality of offsets respectively corresponding to the plurality of characters; and
executing a first plurality of subroutine call instructions to each of the first plurality of addresses.

9. The method of claim 8, further comprising:
determining a second plurality of addresses from the base address and sequentially incrementing by a size of a subroutine call instruction for a number of times; and
executing a second plurality of subroutine call instructions to each of the second plurality of addresses.

10. The method of claim 9, wherein the executing the second plurality of subroutine call instructions to each of the second plurality of subroutine addresses is performed before the executing the first plurality of subroutine call instructions to each of the first plurality of addresses.

11. The method of claim 8, wherein the plurality of characters includes a plurality of American Standard Code for Information Interchange (ASCII) characters.

12. The method of claim 8, further comprising:
allocating an array in a memory medium, wherein elements of the array are possible addresses of the first plurality of addresses.

13. The method of claim 8, wherein a return instruction or a no operation instruction is stored at each of the first plurality of addresses.

14. The method of claim 13,
wherein the no operation instruction is stored at each of the first plurality of addresses; and
wherein the return instruction is stored at an address subsequent to a plurality of possible addresses of the first plurality of addresses.

15. A non-transitory memory medium, comprising instructions executable by a processor of an information handling system, wherein as the processor executes the instructions, the information handling system:
receives a plurality of characters;
determines a plurality of offsets respectively corresponding to the plurality of characters;
determines a first plurality of addresses based on a base address and the plurality of offsets respectively corresponding to the plurality of characters; and
executes a first plurality of subroutine call instructions to each of the first plurality of addresses.

16. The non-transitory memory medium of claim 15, wherein the information handling system further:
determines a second plurality of addresses from the base address and sequentially incrementing by a size of a subroutine call instruction for a number of times; and
executes a second plurality of subroutine call instructions to each of the second plurality of addresses.

17. The non-transitory memory medium of claim 16, wherein the information handling system executes the second plurality of subroutine call instructions to each of the second plurality of subroutine addresses before the information handling system executes the first plurality of subroutine call instructions to each of the first plurality of addresses.

18. The non-transitory memory medium of claim 15, wherein the plurality of characters includes a plurality of American Standard Code for Information Interchange (ASCII) characters.

19. The non-transitory memory medium of claim 15, wherein the information handling system further allocates an array in a memory medium, wherein elements of the array are associated with possible addresses of the first plurality of addresses.

20. The non-transitory memory medium of claim 15, wherein a return instruction or a no operation instruction is stored at each of the first plurality of addresses.

* * * * *